(No Model.) 2 Sheets—Sheet 1.

A. H. WIRZ.
MACHINE FOR FORMING PILLS.

No. 298,148. Patented May 6, 1884.

WITNESSES: INVENTOR (No Model.) 2 Sheets—Sheet 2.

A. H. WIRZ.
MACHINE FOR FORMING PILLS.

No. 298,148. Patented May 6, 1884.

WITNESSES: INVENTOR

UNITED STATES PATENT OFFICE.

AUGUST H. WIRZ, OF PHILADELPHIA, PENNSYLVANIA.

MACHINE FOR FORMING PILLS.

SPECIFICATION forming part of Letters Patent No. 298,148, dated May 6, 1884.

Application filed January 21, 1884. (No model.)

*To all whom it may concern:*

Be it known that I, AUGUST H. WIRZ, a citizen of the United States, residing at Philadelphia, in the county of Philadelphia and State of Pennsylvania, have invented certain new and useful Improvements in Machines for Forming Pills; and I do hereby declare the following to be a full, clear, and exact description of the invention, such as will enable others skilled in the art to which it appertains to make and use the same.

My invention relates to machines for forming pills from material that has been made into a paste or dough rolled or pressed flat and cut into strips of suitable dimensions; and the improvement consists in the manner of constructing the said machine, as will be hereinafter shown and described.

Figure 1:
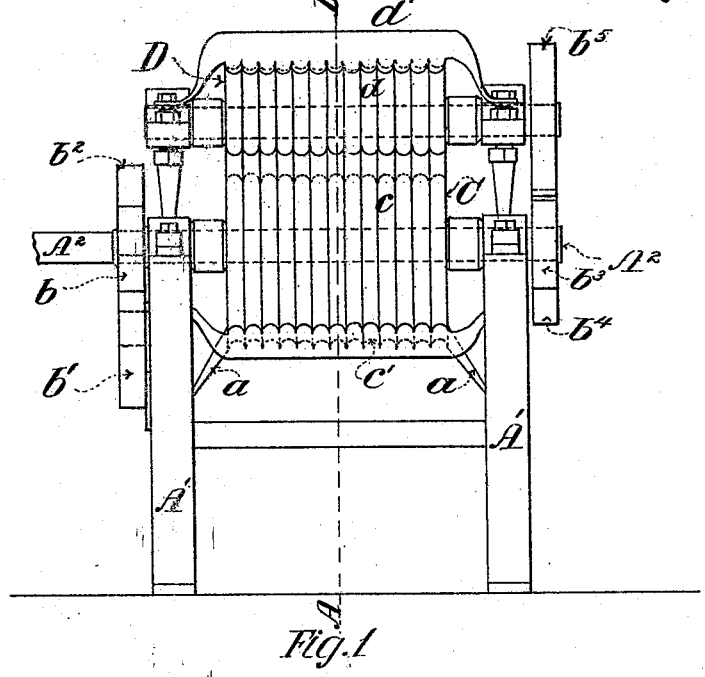
Figure 2:
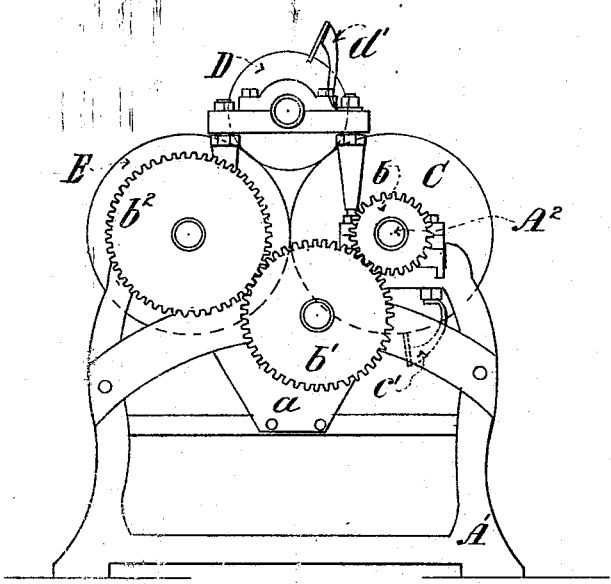
Figure 3:
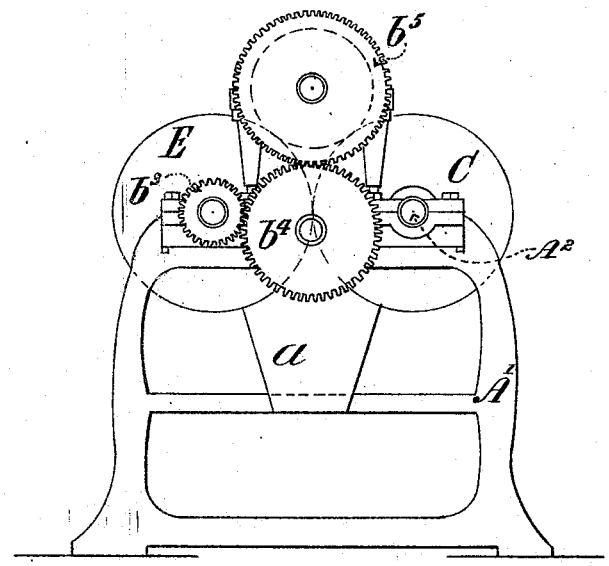
Figure 4:
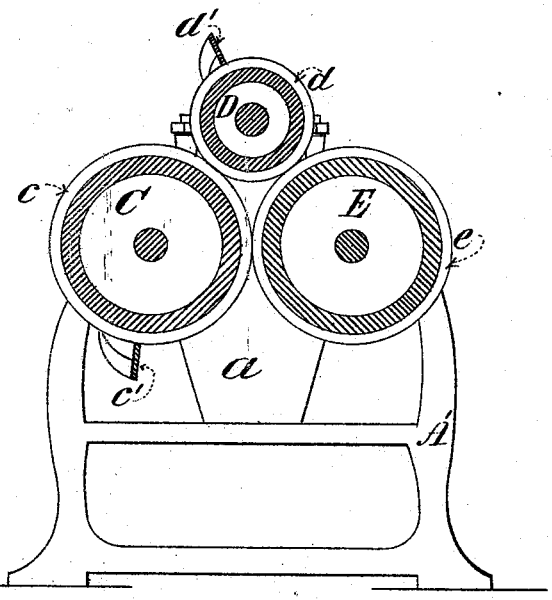

In the accompanying drawings, Figure 1 represents a front elevation of my improved machine. Fig. 2 is a side elevation. Fig. 3 is an elevation of the side opposite to that shown in Fig. 2. Fig. 4 is a cross-section on the line A B.

A' A' represent the frame of the machine.

C D E are three grooved rollers or cylinders secured in the positions shown in Fig. 4.

$c$ $d$ $e$ are the grooves extending around the rollers C D E.

$c'$ $d'$ are combs or rakes secured at either end to the sides of the machine, and fitting into the circular grooves $c$ $d$.

$a$ $a$ are aprons or chutes at the sides of the machine. These chutes are for catching any of the material that may extend beyond or over the ends of the rollers.

$A^2$ is the driving-shaft, carrying the cylinder C, and having a cog-wheel, $b$, secured thereon.

$b'$ is a wheel gearing into the cog-wheel $b$, and conveying the motion to the wheel $b^2$ on the shaft carrying the cylinder E. This shaft has on the opposite end the cog-wheel $b^3$, which gears into the wheel $b^4$, thus conveying the motion to the cog-wheel $b^5$ and revolving the shaft carrying the cylinder D.

The cylinders C D E all revolve in the same direction, and any gearing that will accomplish this result may be used in place of the various cog-wheels herein shown. They are also placed in the frame of the machine, so that the edges of the grooves $c$ $d$ $e$ come directly opposite to each other, the said cylinders being adjusted so that the edges of the grooves on one cylinder just miss those on the other. The edges of the said grooves $c$ $d$ $e$ thus form cutters for dividing the strip of dough. The rakes or combs knock or scrape off any of the pills that may stick in the grooves.

The operation of the machine is as follows: The material to be used in making the pills is formed into a dough and rolled or pressed flat, after which it is cut into long narrow strips of a suitable size. These strips are then placed lengthwise across the grooved roller C, and are carried forward by the motion of the cylinder C, being cut or divided by the edges of the grooves on the cylinders, working together. The continued movement of the cylinder will form the pieces thus cut into spherical-shaped pills, which will pass between the grooves in the bottom cylinders, D E, and drop into a receptacle placed underneath the machine. It will thus be seen that the pills are twice compressed or run between the rollers, and the same result is accomplished with three rollers as would be done by two pairs or sets of rollers. For this purpose the rollers are arranged in a triangular position, and the top roller, D, meets both of the rollers C and E, and these two rollers C and E meet each other.

Having thus described my invention, what I claim as new, and desire to secure by Letters Patent of the United States, is—

1. The herein-described pill-machine, consisting, essentially, of three grooved rollers arranged in triangular relation to each other, so as to serve the purpose of two sets of rollers, substantially as set forth.

2. The combination, with the grooved rollers, of the rakes or combs, substantially as described, constructed and arranged to rest in and clear the grooves in the rollers, substantially as set forth.

In testimony whereof I affix my signature in presence of two witnesses.

AUGUST H. WIRZ.

Witnesses:
THOMAS D. MOWLDS,
G. STROBEL SULLIVAN.